United States Patent [19]

Stuart, Jr.

[11] Patent Number: 5,277,708
[45] Date of Patent: Jan. 11, 1994

[54] BUFFING COMPOSITION

[75] Inventor: James A. Stuart, Jr., Watertown, Wis.

[73] Assignee: S&S Industrial Services, Inc., Waukesha, Wis.

[21] Appl. No.: 4,845

[22] Filed: Jan. 19, 1993

[51] Int. Cl.$^5$ ............................................. C09G 1/04
[52] U.S. Cl. ......................................... 106/8; 106/3; 427/358
[58] Field of Search .................... 106/8, 3; 427/358

[56] References Cited

U.S. PATENT DOCUMENTS

| | | | |
|---|---|---|---|
| 4,070,510 | 1/1978 | Kahn | 106/8 |
| 4,158,553 | 6/1979 | Chapman | 106/8 |
| 4,182,686 | 1/1980 | Laks et al. | 106/8 |
| 4,317,755 | 3/1982 | Gregory | 106/8 |
| 4,347,333 | 8/1982 | Lohr et al. | 106/10 |
| 4,895,676 | 1/1990 | Smith | 252/539 |
| 4,923,514 | 5/1990 | Brown | 106/3 |
| 4,952,240 | 8/1990 | Smith | 106/8 |
| 5,143,949 | 9/1992 | Grogan et al. | 427/155 |

Primary Examiner—Helene Klemanski
Attorney, Agent, or Firm—Andrus, Sceales, Starke & Sawall

[57] ABSTRACT

A composition for buffing metal parts comprising from 2% to 12% by weight of a fatty acid or fatty ester, 0.5% to 10% by weight of a nonionic water soluble surfactant, 10% to 50% by weight of an abrasive grit, 40% to 70% by weight of water, a sufficient amount of an alkaline to provide the composition with a pH in the range of 6.5 to 9.0, and 0.3% to 3.0% by weight of an acrylic copolymer which provides a paste-like consistency for the composition. The composition is water washable from the metal part after buffing.

7 Claims, No Drawings

BUFFING COMPOSITION

BACKGROUND OF THE INVENTION

Metal parts are buffed either manually or through mechanical buffing equipment using a buffing composition of paste like consistency. In the past, the buffing compositions have consisted of a water emulsion of abrasive grit and a oleophillic material such as tallow, myristic acid, petrolatum or a combination of these ingredients. The oleophillic material provides the buffing composition with a thick paste like consistency to suspend the grit and provides lubricity for the composition.

It has been found that the conventional buffing compositions are very difficult to remove by water washing from the buffed metal part. Even when the metal part has been subjected to several water washes, the buffing composition may not be completely removed. This is of a particular problem when the buffed part is to be subsequently plated in which case the metal requires a completely clean surface. Because of this, the common practice has been to remove the residual buffing composition from the metal parts through use of a chlorinated solvent. However, chlorinated solvents are hazardous to use and provide environmental problems.

Therefore, there has been a need for a buffing composition which can be readily and completely removed from the buffered parts by a water wash.

SUMMARY OF THE INVENTION

The invention is directed to an improved buffing composition that is water washable.

The composition comprises from 2% to 12% by weight of a fatty acid or fatty ester, 0.5% to 10% by weight of a non-ionic water soluble surfactant, 10% to 50% by weight of abrasive grit, 40% to 70% by weight of water, a sufficient amount of an alkaline material, such as sodium or potassium hydroxide, to provide the composition with the pH in the range of 6.5 to 9.0, and from 0.3% to 3.0% by weight of a water soluble acrylic copolymer.

The high molecular weight acrylic copolymer has the ability to provide the composition with a paste-like viscosity in the pH range of 6.5 to 9.0.

The buffing composition of the invention has the advantage that it is water washable from the buffed part and thus eliminates the need for chlorinated solvents that have been used in the past to remove the residual buffing composition.

It has also been found that the buffing composition of the invention, when used in pressurized systems, provides better lubrication of the buffing wheels and increased wheel life. The composition does not dry out as quickly as conventional buffing compositions thereby increasing the time intervals of application of the composition to the buffing wheel and thus reducing the overall amount of buffing composition to be used.

As the composition is completely water washable, a substantial labor saving is achieved for hand wiping of the buffed parts is not required.

Other objects and advantages will appear during the course of the following description.

DESCRIPTION OF THE PREFERRED EMBODIMENT

The invention is directed to an improved buffing composition that can be readily water washed from the buffed parts.

In general, the composition has the following formulation in weight percent:

| Fatty acid or fatty ester | 2.0%–12.0% |
| Surfactant | 0.5%–10.0% |
| Water | 40.0%–70.0% |
| Acrylic copolymer | 0.3%–3.0% |

The composition has the following preferred formulation in weight percent:

| Fatty acid or fatty ester | 2.0%–6.0% |
| Surfactant | 0.5%–3.0% |
| Abrasive grit | 20.0%–45.0% |
| Water | 40.0%–70.0% |
| Acrylic copolymer | 0.4%–2.0% |

The composition also contains a sufficient amount of an alkaline material to provide the composition with a pH in the range of about 6.5 to 9.0, and preferably a pH of 8.0 to 9.0.

The fatty acid to be used in the composition contains from 16 to 20 carbon atoms in the molecule and can take the form of a material such as oleic acid or linoleic acid. Tall oil which is a by-product of the wood pulp industry and contains rosin acids, as well as oleic and linoleic acids can also be used.

The fatty ester in general contains 12 to 18 carbon atoms in the molecule and can be an alkyl $C_{12}$ to $C_{18}$ methyl ester derived from vegetable or animal fatty acids, such as Methyl Ester C sold by Mayco Oil & Chemical Company.

The surfactant is preferably a water soluble non-ionic type, such as an ethylated nonylphenol sold under the tradename Surfonic N-95 by Texaco Chemical Co., or Tergitol NP-9 or Tergitol NP-10 by Union Carbide Chemical and Plastics Co., Industrial Chemicals Division.

The surfactant aids in thickening the composition and is a key component in the water washability of the composition.

The grit can be any conventional type of grit used in buffing compositions such as pumice, calcined alumina, aluminum oxide, tripoli green chromium oxide, microcrystalline silica, or the like. The type and particle size of the grit depends on the use. For cutting, a coarse hard grit is used, while for color, to obtain a high microfinish, a fine softer grit is employed.

The water soluble acrylic copolymer has a high molecular weight, generally in the range of about 500,000, and can be a material such as Acusol 820 sold by Rohm and Haas Company. The acrylic copolymer has the ability to thicken the composition when the pH is raised to a value, generally in the range of 6.5 to 9.0, to thereby provide a paste-like consistency which suspends the grit particles and prevents them from settling.

The alkaline material which is employed to raise the pH to a range of 6.5 to 9.0 can be an alkali metal hydroxide such as sodium or potassium hydroxide or a water soluble alkali metal salt, such as trisodium phosphate.

When tall oil is used as the fatty acid component in the formulation, an alkylene glycol is preferably incorporated to fluidize the product and prevent lumps from being formed. The alkylene glycol can take the form of hexylene glycol, diethylene glycol, propylene glycol or the like and is used generally in an amount of 0.5% to 3.0% by weight of the composition and preferably an amount of 1.0% to 2.5% by weight.

A specific example of the buffing composition of the invention is as follows in weight percent.

| | |
|---|---|
| Tall oil fatty acid | 6.0% |
| Hexylene glycol | 1.0% |
| Pumice | 35.0% |
| Potassium hydroxide | 1.5% |
| Trisodium phosphate | 0.8% |
| Surfonic N-95 (surfactant) | 1.0% |
| Acrylic copolymer (Acusol 820) | 1.2% |
| Water | 53.5% |

In preparing the above buffing composition a pre-blend is initially made consisting of the tall oil, hexylene glycol, the surfactants, and the potassium hydroxide. The water and pumice are mixed with the pre-blend and the trisodium phosphate is added as a final adjustment to provide a pH of 8.5. The acrylic copolymer is then added to the mixture causing the mixture to rapidly thicken and provide a paste-like consistency.

The buffing composition of the invention has a thick paste-like consistency and can be used either in manual or pressurized buffing systems. In pressurized buffing systems, the viscosity of the composition is such that it can be readily pumped and applied to the buffing wheels.

The buffing composition of the invention has a distinct advantage that it is water washable and can be completely removed from the buffed part through a washing system without the use of chlorinated solvents or manual wiping. As the composition is water washable from the buffed parts, the overall cost of the buffing operation is substantially reduced over conventional buffing methods.

The composition has also been found to provide better lubrication of the buffing wheel and will not dry out as quickly as conventional buffing compositions. This not only increases the service life of the buffing wheels, but also extends the time interval of application of the composition to the buffing wheels, thus reducing the overall amount of buffing composition to be employed.

Various modes of carrying out the invention are contemplated as being within the scope of the following claims, particularly pointing out and distinctly claiming the subject matter which is regarded as the invention.

I claim:

1. A buffing composition, consisting essentially of by weight from 2% to 12% of a material selected from the group consisting of fatty acids and fatty esters, 0.5% to 10% of a non-ionic water soluble surfactant, 10% to 50% of abrasive grit, 40% to 70% of water, 0.3% to 3.0% of a water soluble acrylic copolymer, and a sufficient amount of an alkaline material to provide the composition with a pH in the range of 6.5 to 9.0, said composition being water washable from a buffed part.

2. The composition of claim 1, wherein said acrylic copolymer is characterized by the ability to thicken the composition to a paste like consistency at said pH range of 6.5 to 9.0.

3. The composition of claim 1, wherein said material is present in an amount of 2% to 6%, said surfactant is present in an amount of 0.5% to 3%, said grit is present in an amount of 20% to 45% by weight, said water is present in an amount of 40% to 70% and said acrylic copolymer is present in an amount of 0.4% to 2%.

4. The composition of claim 1, wherein said grit is selected from the group consisting of pumice, calcined alumina, aluminum oxide, green chrome oxide, tripoli and mixtures thereof.

5. The composition of claim 1, wherein said alkaline material is an alkali metal hydroxide.

6. A method of buffing a metal part, comprising the steps of preparing a buffing composition comprising by weight from 2% to 12% of a material selected from the group consisting of fatty acids and fatty esters, 0.5% to 10% of a non-ionic water soluble surfactant, 10% to 50% of abrasive grit, 40% to 70% by weight of water, 0.3% to 3.0% of a water soluble acrylic copolymer, and a sufficient amount of an alkaline material to provide the composition with a pH in the range of 6.5 to 9.0, applying said composition to a rotatable buffing wheel, contacting a metal part to be buffed with the buffing wheel to thereby buff the part, and thereafter washing residual buffing composition from the buffed part with water.

7. A method of buffing a metal part, comprising the steps of admixing a material selected from the group consisting of fatty acids and fatty esters, a non-ionic water soluble surfactant, an abrasive, grit and water to produce a composition, adding an alkaline material to said composition to obtain a pH in the range of 6.5 to 9.0 adding a water soluble acrylic copolymer to the composition to provide a thickened viscous composition, said viscous composition comprising by weight from 2% to 12% of said material, 0.5% to 10% of said non-ionic water soluble surfactant, 10% to 50% of said abrasive grit, 40% to 70% of said water, and 0.3% to 3.0% of said water soluble acrylic polymer, applying the thickened composition to a buffing wheel, rotating the buffing wheel in contact with a metal part to buff the part, and contacting the buffed part with water to remove the residual buffing compound from said part.

* * * * *